No. 782,021. PATENTED FEB. 7, 1905.
H. FRIBERG.
PROCESS OF STERILIZING WATER BY MEANS OF OZONIZED AIR.
APPLICATION FILED NOV. 3, 1903.
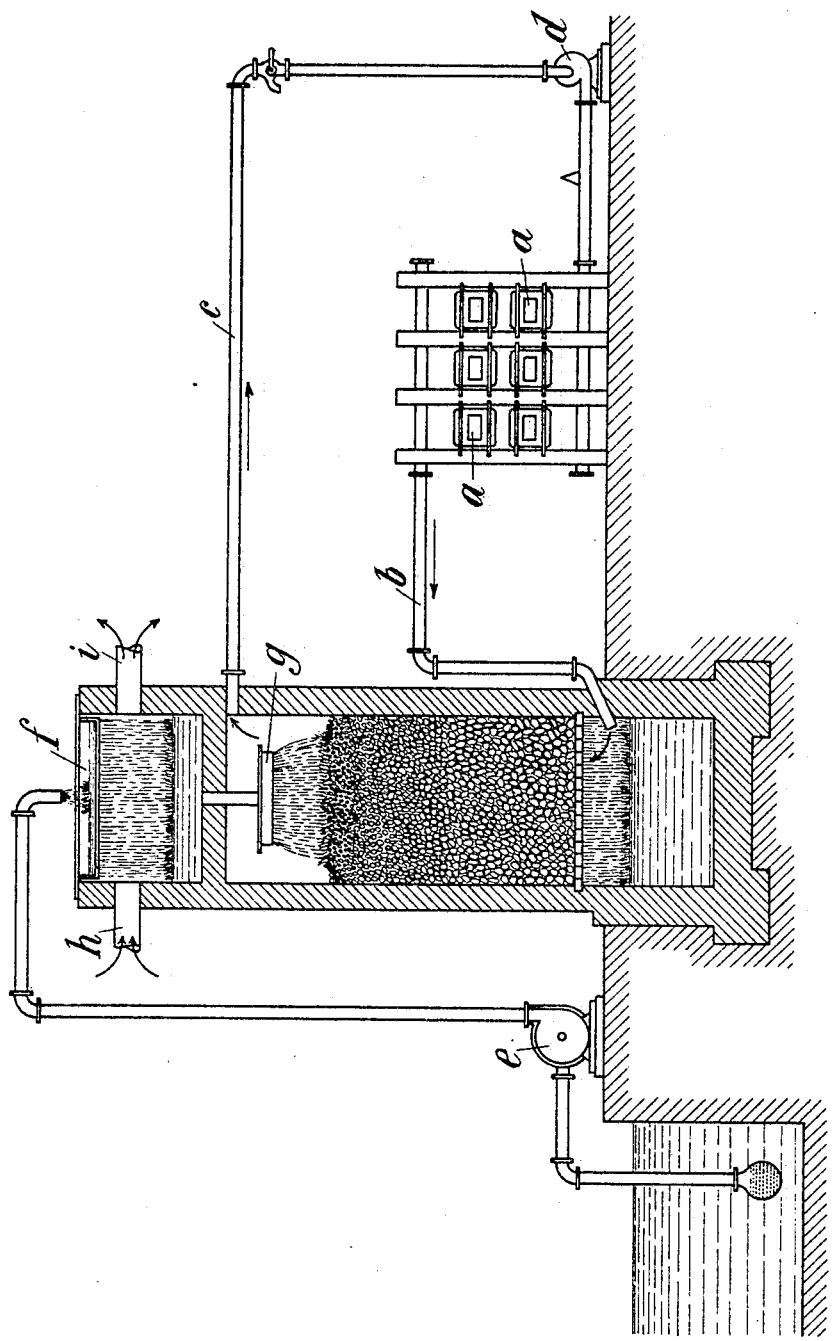

No. 782,021. Patented February 7, 1905.

UNITED STATES PATENT OFFICE.

HJALMAR FRIBERG, OF CHARLOTTENBURG, GERMANY, ASSIGNOR TO SIEMENS & HALSKE AKTIENGESELLSCHAFT, OF BERLIN, GERMANY.

PROCESS OF STERILIZING WATER BY MEANS OF OZONIZED AIR.

SPECIFICATION forming part of Letters Patent No. 782,021, dated February 7, 1905.

Application filed November 3, 1903. Serial No. 179,685.

*To all whom it may concern:*

Be it known that I, HJALMAR FRIBERG, a subject of the King of Sweden and Norway, residing at Charlottenburg, in the Kingdom of Prussia, German Empire, have invented a new and useful Improvement in Processes for the Sterilization of Water by Means of Ozonized Air or other Ozonic-Gas Mixtures, of which the following is a specification.

My invention is directed particularly to improvements in what is known in the art as the "cyclic" process of the sterilization of water by means of ozone—such, for instance, as is disclosed in German Patent No. 124,238, granted July 28, 1899, to Ernst Dillan, of Berlin.

Prior to my invention it was old in the art to treat liquids with ozonized air by continuously supplying to the ozonizer ozonic air which had already been used after adding oxygen or fresh air thereto, as disclosed in the before-mentioned German patent.

In order to keep the concentration of ozone in the air as constant as possible, the latter was subjected to a cyclic process, which consists in leading the ozonic air through a closed circuit including the ozonizer and the sterilizer for treating the liquid. Oxygen or fresh ozonic air was admitted through this circuit at a definite point, while a corresponding quantity of ozonic-air mixture that had already been used in the treatment of the liquid was allowed to escape from the ozonizer.

My improvement consists in first treating the water or liquid to be sterilized to an aerating process and then subject it to the cyclic ozone process, as will now be pointed out by reference to the accompanying drawing, which is a transverse sectional view through the purifying apparatus, parts of the associated mechanism being shown in elevational view.

*a* is the ozone-generating apparatus, which is of any well-known structure, the same being connected at one side by a pipe *b* to the bottom of the sterilizer and at a point below the filter thereof, which is preferably of the sand or stone type.

*c* represents an outlet-pipe running from the top of the sterilizer to a ventilator or air-pump *d*, which in turn is connected directly to the ozonizer *a*, so as to complete the cyclic process, as disclosed in the before-mentioned German patent.

*e* represents a force-pump connected by proper pipes for raising water from a source of supply to the top of the apparatus, where it is admitted to a reservoir *f*, provided with a perforated bottom designed to divide the water in its downward flow into finely-divided streams.

*h* is an inlet-pipe, and *i* an outlet-pipe, the function of said pipes being to admit of the passage of oxygen or pure air through the water in large volumes and in such manner as to thoroughly aerate it as it falls and ultimately passes downward through a finely-perforated nozzle *g*, the arrangement being such that the water falls at all times from the chamber *f* in finely-divided streams and from the nozzles *g* in correspondingly finely-divided streams, so that in the first instance it will be thoroughly aerated and in the second instance it will be effectually subjected to the cyclic ozone process, as will be apparent on inspection of the drawing, the ozone passing from the ozonizer *a* in the direction of the arrows at the bottom of the sterilizer upward through the filter and the finely-divided streams of water, thence again to the right, and finally through the ventilator or air-pump *d*, when it is again forced into and through the ozonizer *a*. In first thus subjecting the water to an aerated process I am enabled to easily remove the oxidizable gases from the impure water, and thereby prevent their being set free after they enter the sterilizer and become mixed with the ozone. If these oxidizable gases were permitted to be set free, they would be decomposed on mixing with the ozone, thus decreasing the efficiency of the latter, and in this material improvement is found the essence of my invention.

I make no claim hereinafter to the structural apparatus by which the method or process of sterilizing water is effected, as this feature will constitute the subject-matter of a divisional application to be filed in the United States Patent Office at a later day.

Having thus described my invention, what I claim, and desire to secure by Letters Patent of the United States, is—

1. The described process of sterilizing water, consisting in first aerating it and then subjecting it to the action of ozone.

2. The described process of sterilizing water, consisting in first aerating it and then subjecting it to the cyclic action of ozone under pressure.

3. The described process of sterilizing water, consisting in subjecting finely-divided streams thereof to the action of oxygen or pure air and then subjecting the water thus treated to the action of ozone.

4. The described process of sterilizing water, consisting in subjecting finely-divided streams thereof to the action of oxygen or pure air, and then subjecting the water thus treated to the cyclic action of ozone under pressure.

In witness whereof I hereunto subscribe my name this 13th day of October, A. D. 1903.

HJALMAR FRIBERG.

Witnesses:
 WOLDEMAR HAUPT,
 HENRY HASPER.